May 16, 1950 — E. K. BROWN — 2,508,097
WEARING SEAT
Filed May 14, 1945
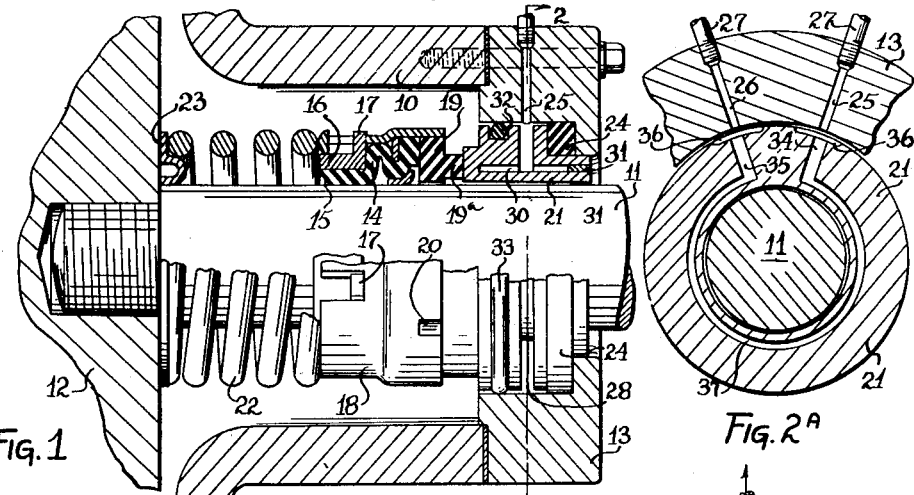
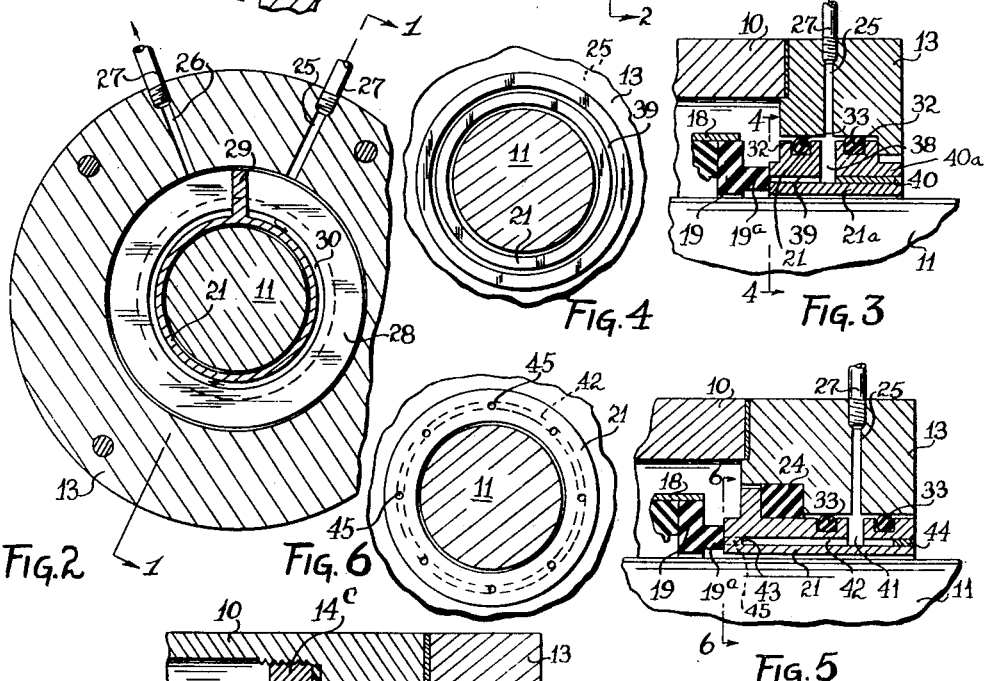
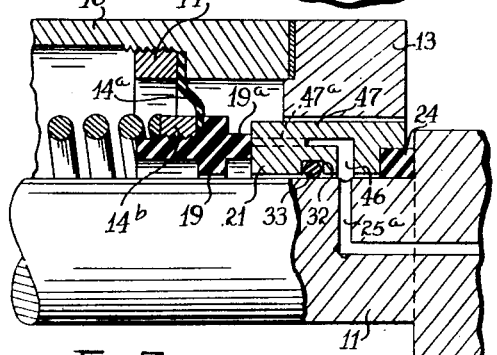
INVENTOR.
EDWARD K. BROWN
BY Kuis Hudson
Boughton & Williams
ATTORNEYS Patented May 16, 1950

2,508,097

UNITED STATES PATENT OFFICE 2,508,097

WEARING SEAT

Edward K. Brown, Shaker Heights, Ohio, assignor to Crane Packing Company, Chicago, Ill., a corporation of Illinois Application May 14, 1945, Serial No. 593,737

3 Claims. (Cl. 286—9)

This invention relates to temperature controlling and/or lubricating means used in connection with two contacting relatively rotatable friction producing parts wherein temperature changes may be caused in operation as, for example, the wearing seat of a mechanical seal such as is employed in pumps, compressors, gear boxes, speed reducers and other comparable units or installations.

It is contemplated to have the means embodying the invention perform its temperature control and/or lubrication of the part to which it is applied by the circulation therethrough of a suitable temperature controlling and/or lubricating fluid, either gas or liquid, and when the fluid is a lubricant the same may be introduced to the contacting friction producing surfaces of the two relatively rotatable parts.

An object of the invention is to provide improved means for controlling the temperature of one of two contacting relatively rotatable parts and/or to reduce the friction at the contacting surfaces of said parts, wherefore wear of the parts due to the relative movement between the contacting surfaces thereof is reduced to a minimum while the life of the parts and the efficiency of operation thereof are greatly increased.

Another object is to provide in combination with the wearing seat of a mechanical seal, such as is employed in pumps, compressors, gear boxes, speed reducers and other comparable units or installations, means for increasing the life and efficiency of the wearing seat and for reducing the wear on said seat due to its contact with a part rotating relative thereto.

Another object is to provide improved means for controlling the temperature of a wearing seat, as referred to in the last mentioned object, and/or for lubricating the surface of the wearing seat which is in contact with a part moving relative thereto, to thus increase the life and effectiveness of the wearing seat.

Further and additional objects and advantages not hereinbefore specified will become apparent during the detailed description of several embodiments of the invention which is to follow.

Referring to the accompanying drawing:

Fig. 1 is a fragmentary longitudinal sectional view through a pump employing as part of the seal a wearing seat in which the invention is embodied, said view being taken substantially on line 1—1 of Fig. 2 looking in the direction of the arrows.

Fig. 2 is a fragmentary transverse section through the pump shown in Fig. 1 and is taken substantially on line 2—2 of Fig. 1 looking in the direction of the arrows.

Fig. 2a is a view similar to Fig. 2 but showing a slightly different form of construction embodying the invention.

Fig. 3 is a fragmentary longitudinal sectional view similar to Fig. 1 but showing a different form of construction embodying the invention than is shown in Figs. 1, 2 and 2a.

Fig. 4 is a fragmentary transverse sectional view taken substantially on line 4—4 of Fig. 3 looking in the direction of the arrows.

Fig. 5 is a fragmentary longitudinal sectional view similar to Figs. 1 and 3 but showing a different form of construction embodying the invention than is shown in Figs. 1 and 3 and also in Fig. 2a.

Fig. 6 is a fragmentary transverse sectional view taken substantially on line 6—6 of Fig. 5 looking in the direction of the arrows, and Fig. 7 is a longitudinal sectional view similar to Figs. 1, 3 and 5 but illustrating a different form of construction embodying the invention than any of those shown in the previous figures.

It will be understood that the invention is shown herein in conjunction with the wearing seat of a seal for a pump simply by way of illustration and not by way of limitation, even though the invention is of particular utility when employed in such environment. However, it should be borne in mind that the invention is of broader application and might be employed advantageously in connection with relatively movable parts having contacting surfaces and utilized in various forms of apparatus.

The pump shown in the drawings and illustrating a structure in which the invention may be embodied includes a casing 10, a rotatable shaft 11 and an impeller 12 secured to the shaft. The casing 10 is provided with an end cap 13 which is shown as separate from the casing and secured thereto by suitable bolts although said end cap might be formed integral with the casing. The pump is illustrated as provided with a shaft seal which comprises a flexible bellows 14 preferably formed of synthetic rubber or other similar and suitable material. The tail or driving end 15 of the flexible bellows is press fitted on the shaft 11 and the fit is maintained by a driving band 16 preferably formed of metal. The driving band 16 is provided with radial projections or ears 17 that engage in slots formed in a retainer shell 18 and which shell is formed preferably of suitable metal. The retainer shell 18 has its end of larger diameter surrounding a sealing washer 19 and acts to drive the sealing washer by virtue of indentations 20 formed in the retainer shell and fitting notches in the edge of the sealing washer. The sealing washer 19 is formed of carbon, bronze, hardened steel or any other material suitable for the operating conditions to be encountered.

It will be understood that in the instant example the sealing washer 19 is positively driven by the shaft 11 through the driving band 16 and the retainer shell 18, it being noted that the sealing washer 19 has a loose fit on the shaft 11. The sealing washer 19 is shown as provided on one face thereof with an annular outwardly projecting raised face or rib 19a, the end of which contacts a surface of a wearing seat 21, although the washer 19 may have the raised face or rib 19a omitted and in such instance its end face would contact the wearing seat. A coil spring 22 at one end surrounds the driving band 16 and abuts against the smaller end of the retainer shell 18. The other end of the spring 22 abuts a spring holder 23 surrounding the shaft 11 and engaging the impeller 12 and acting to maintain the spring 22 properly centered.

It will be seen that the flexible bellows 14 enables the sealing washer 19 to advance under the action of the spring 22 to maintain the raised face or rib 19a in contact with the surface of the wearing seat 21, as the contacting sealing surfaces of the raised face or rib 19a and the wearing seat 21 wear in operation.

The wearing seat 21 is mounted in the center bore and counterbore of the end cap 13 to have a floating movement therein by means of a flexible holding ring 24 which may be formed of suitable material such as synthetic rubber. It will be noted that there is clearance between the shaft 11 and the bore through the wearing seat 21. The structure thus far described is known commercially and per se does not constitute the subject matter of the present invention. However, since the construction illustrated and just described employs the relatively rotatable parts 19 and 21 which have contacting surfaces subject in use to temperature changes and wear, the invention very advantageously can be embodied in such a construction and will be so explained herein.

Referring first to Figs. 1 and 2, the end cap 13 as shown is provided with an inlet passage 25 and an outlet passage 26 extending therethrough and having their inner ends communicating with the counterbore in the end cap. The passages 25 and 26 may be formed in the end cap 13 in various ways and may extend in any suitable direction so long as their inner ends communicate with the counterbore. However, from the standpoint of manufacturing facility said passages preferably would be drilled in the end cap 13 and extend radially thereof and therefore the passages have been so shown herein.

The inner ends of the passages 25 and 26 may be spaced apart circumferentially of the counterbore in the end cap 13 any desired distance but preferably said inner ends will be sufficiently close together to provide for a circulation of the fluid passing therethrough substantially completely around the wearing seat 21 as will later be more fully explained. The passages 25 and 26 have connected to their outer ends suitable fittings 27, wherefore the passage 25 may be connected to a suitable supply source of fluid such as a temperature controlling gas or liquid or a lubricant while the passage 26 can be suitably connected to an exhaust for said fluid.

As illustrated in Figs. 1 and 2, the wearing seat 21 is provided in its periphery and intermediate its ends with a groove 28 extending almost completely around the wearing seat except for a partition portion 29 which when the wearing seat is mounted in the cap 13 is located intermediate the inner ends of the passages 25 and 26. The bottom of the groove 28 is in communication with fluid conduit means in the form of an annular axially extending chamber 30 formed in the wearing seat 21 and extending from the outer end of the wearing seat, i. e., the right hand end as viewed in Fig. 1, inwardly and toward the inner end of the seat but terminating in this instance short thereof. The chamber 30 is in axial alignment with the raised face or rib 19a of the sealing washer 19. The outer end of the chamber 30 may be closed by a suitable closure ring or plug 31. It will be noted that the width of the groove 28 is greater than the diameter of the passages 25 and 26 for the purpose of facilitating the assembly of the wearing seat 21 in the cap 13 with the passages and the groove in communication with each other and also to insure that said communication will not be disturbed due to any floating movement which the wearing seat 21 may have in the operation of the device.

The wearing seat 21 is provided in its periphery and inwardly of the groove 28, with an annular peripheral groove 32 in which is mounted a packing ring 33. The packing ring 33 in this instance is shown as normally of circular cross section and of such diameter that when the ring is mounted in the groove 32 and the wearing seat is assembled in the cap 13 the ring will be distorted slightly from circular cross section toward oval cross section. Although the groove 32 is shown as of rectangular cross section and the ring 33 as of circular cross section it will be understood that the cross sectional shapes of the groove and ring may vary. The ring 33 preferably is formed of suitable material such as synthetic rubber. The ring 33 together with the holding ring 24 provide annular seals on the opposite sides of the passages 25 and 26 and the groove 28 and prevent the leakage of the fluid circulating through said passages and said groove 28 either outwardly of the wearing seat or inwardly thereof. In fact, the space between the rings 24 and 33, the end cap 13 and the wearing seat 21 may be designated a collecting chamber for the circulated fluid.

The construction shown in Figs. 1 and 2 illustrates the temperature controlling means in this instance as utilizing a circulating temperature controlling fluid through the wearing seat 21. Although it is conceivable and is within the purview of the present invention that instances might arise wherein it would be desirable to circulate a heated fluid through the wearing seat 21 for the purpose of controlling the temperature thereof, in most instances the fluid circulated through the wearing seat would be for the purpose of decreasing the temperature thereof by cooling the same and therefore the description will refer to this most probable situation. Although the circulated fluid may be a gas it probably would be preferable to circulate a liquid through the wearing seat 21. On this assumption it may be stated that a suitable liquid is circulated through the inlet passage 25, the groove 28, chamber 30 and outlet passage 26 during the operation of the device and such circulating liquid will maintain the temperature of the wearing seat 21 at the desired low level, notwithstanding the heat produced by the friction between the contacting and relatively rotating surfaces of the wearing seat 21 and the raised face or rib 19a of the sealing washer 19. In this way danger of overheating of the parts is obviated and thus the efficiency as well as the life of the device is increased.

In Fig. 2a a form of construction slightly different from that shown in Figs. 1 and 2 is illustrated. In place of providing the wearing seat 21 with the peripheral groove 28 said wearing seat is formed with a radially extending passage 34 in continuation of the inlet passage 25 and a radially extending passage 35 in continuation of the outlet passage 26. The passages 34 and 35 may be of greater diameter than the inlet passages 25 and 26 and have their outer ends terminating in peripheral recesses 36 formed in the wearing seat 21 for the purpose of facilitating assembly and insuring communication of the passages 25 and 26 with the passages 34 and 35. The inner ends of the passages 34 and 35 are in communication with an axially extending chamber 37 formed in the wearing seat 21 and similar to the arcuate axially extending chamber 30 of the first described form of construction. It will be understood that the construction shown in Fig. 2a operates in the same manner as does the construction shown in Figs. 1 and 2.

In Figs. 3 and 4 there is shown a still different form of construction embodying the invention and one wherein lubricant is introduced into the interior of the wearing seat 21 and to the contacting surfaces of said wearing seat and the raised face or rib 19a of the sealing washer 19. The wearing seat 21 in Fig. 3 is provided with a peripheral groove 38 similar to the previously described groove 28 and said groove 38 is in communication with the inlet passage 25 only or with both the inlet passage 25 and the outlet passage 26 depending on whether or not the lubricant is simply pressure forced into the wearing seat or is circulated therethrough. It will be understood that the inlet passage 25 in either instance is connected to a suitable supply source of lubricant. It has been assumed that only the inlet passage 25 is employed and that the lubricant is pressure forced through said passage and into the groove 38. In this instance the groove 38 may be continuous and the partition 29 omitted. The wearing seat 21 is provided with an annular chamber or passage 39 extending axially partially through the wearing seat and having its inner end terminating at the surface of the wearing seat which contacts the raised face or rib 19a of the sealing washer 19. In the form of construction disclosed in Figs. 3 and 4 the wearing seat 21 may be formed of two parts, i. e., an inner part or tube 21a surrounding the shaft 11 inwardly of the chamber 39 and an outer part 40a suitably connected to the inner part as, for instance, by means of a connecting and closure ring 40 sealing the outer end of the chamber or passage 39.

In addition to the wearing seat 21 being provided with the annular peripheral groove 32 and sealing ring 33 inwardly of the groove 38, said wearing seat is shown as provided with a second annular peripheral groove 32 and sealing ring 33 outwardly of the groove 38 and substantially in the location occupied by the holding ring 24 in the construction shown in Fig. 1. The sealing rings 33 perform the sealing function of the holding ring 24 and the sealing ring 33 in the previously described form. It will be seen that lubricant coming through the passage 25 and entering the groove 38 will have access to the chamber 39 and to the contacting surfaces of the wearing seat and the raised face or rib 19a of the sealing washer 19 and thus will lubricate said contacting surfaces and reduce the friction therebetween, thus lessening produced heat. Also the lubricant in the groove 38 and chamber or passage 39 will act to reduce the heat in the wearing seat as a whole. If the lubricant is under pressure greater than the pressure within the casing 10, the lubricant will prevent dirt, grit and abrasive particles from working between the contacting surfaces of the wearing seat and sealing washer. In the Fig. 3 form, the fluid is under pressure and hence holds the seat against the washer 19.

In Figs. 5 and 6 there is illustrated a still different form of the invention. In this form the wearing seat is of longer axial length than the wearing seats previously shown and the holding ring 24 is interposed between the end cap 13 and the wearing seat adjacent the inner end of the latter, while the sealing rings 33 are located outwardly of the holding ring 24 and on opposite sides of the peripheral groove 41 which corresponds to the grooves 28 and 38 previously described. The sealing rings 33, the end cap 13 and the wearing seat 21 define a collecting chamber for the circulated fluid. The groove 41 communicates with an arcuate axially extending chamber or passage 42 formed in the wearing seat 21 and similar to the chamber 30 previously described. The chamber or passage 42 extends inwardly of the wearing seat from the outer end thereof but terminates short of the inner end as indicated at 43. The outer end of the chamber 42 is closed by a closure ring 44. The wearing seat 21 in its inner end is provided with a plurality of circumferentially spaced axially extending holes 45 which communicate with the chamber 42 and terminate at the surface which contacts the raised face or rib 19a of the sealing washer 19. It will be seen that coolant or lubricant can be circulated through the groove 41 and chamber 42 of the wearing seat and that the holes or openings 45 act to transmit said lubricant or coolant to the contacting relatively rotating surfaces of the wearing seat and the sealing washer. It will be understood that the other forms of construction herein illustrated may be provided with openings similar to the openings 45 if so desired.

In Fig. 7 the cap 13 is not provided with either the inlet passage 25 or the outlet passage 26 but said passages are formed in the shaft 11 as indicated by the passage 25a shown in Fig. 7. This arrangement may be used where the shaft and wearing seat 21 are stationary and the casing 10 and sealing washer 19 are rotatable relative thereto. This is a condition which may be met in commercial designs, but the Fig. 7 modification can be applied with equal facility wherever the wearing seat is mounted in the shaft and the washer 19 is fixed to the casing through a suitable flexible sealing member 14a with either the shaft or the casing, or both, rotating. The flexible sealing member 14a is secured to the washer 19 by a clamping nut 14b and to the casing 10 by a similar clamping nut 14c. The wearing seat 21 is provided with an arcuate groove 46 extending radially of the wearing seat from the bore therethrough and toward the outer circumference of the wearing seat. The groove 46 is comparable to the grooves 28, 38 and 41 previously described and is in registration and communication with the inlet passage 25a as well as the outlet passage when the latter is employed. The wearing seat 21 is provided with an arcuate axially extending chamber or passage 47 similar to the chambers 30, 37, 39 or 42. The chamber or passage 47 communicates with the groove 46 and is shown as extending toward the inner end of the wearing seat but terminating a substantial distance from said inner end. The wearing seat 21 is provided with circularly spaced openings 47a extending from the chamber or passage 47 to the inner end of the wearing seat. Lubricant may be introduced through the passage 25a, groove 46, chamber or passage 47 and openings 47a to the contacting relatively rotating surfaces of the wearing seat and sealing washer.

The inner circumference of the wearing seat 21 is provided on the inner side of the groove 46 with an annular groove 32 in which is mounted a sealing ring 33 which contacts the shaft 11. The wearing seat 21 also mounts a holding ring 24 on the outer side of the groove 46 and said holding ring contacts the periphery of the shaft 11 as well as a shoulder formed on the shaft. In place of providing the shaft 11 with said shoulder, a snap ring might be used, as will be well understood. The sealing ring 33, holding ring 24, wearing seat 21 and shaft 11 form a collecting chamber for the lubricant.

From the foregoing description of a number of different embodiments of the invention it will be apparent that the temperature and/or lubrication of the wearing seat can be controlled or maintained as desired by the circulation therethrough of a fluid such as a coolant or a lubricant. The lubricant can be introduced to the contacting relatively rotating surfaces of the wearing seat and the sealing washer. Consequently the life and the efficiency of operation of the device is increased since wear and deterioration of the parts are reduced to a minimum. It will also be noted that the wearing seat can be provided with passages and chambers for accomplishing the results referred to in various ways readily suitable for convenient and practical manufacturing operations.

It will be understood that the features and the arrangements shown in the different forms of constructions embodying the invention may be used interchangeably, in whole or in part, in any of said forms as desired or as conditions may require.

Although several embodiments of the invention have been illustrated and described herein it will be understood that the invention is susceptible of various other modifications and adaptations within the scope of the appended claims.

Having thus described my invention, I claim:

1. In a fluid seal device for a chamber having a closure cap, a wearing seat comprising a ring, a tube telescoped into the ring and extending axially beyond one side of the ring, there being an annular space between the ring and tube, flexible means for effecting a seal between the ring and cap, means for effecting a seal between the tube and cap, and means for introducing fluid into the annular space between the flexible sealing means and the means for effecting a seal between the tube and cap.

2. In a fluid seal device for a chamber having an apertured cap and a shaft passing through the aperture, a sealing washer surrounding the shaft, flexible means for effecting a seal between the washer and shaft, said washer having a radially disposed sealing surface, a wearing seat for effecting a seal between the washer and cap, said seat comprising a ring having a radially disposed surface for contacting the radially disposed surface on the washer, a tube telescoped into the ring and having a radially disposed sealing surface also in contact with the said surface on the washer, there being an annular space between the tube and ring, means for effecting a seal between the ring and cap, means spaced from the last-mentioned means for effecting a seal between the tube and cap, and means for introducing fluid between the sealing means for the ring and tube and into the space between the said ring and tube.

3. The combination in a fluid seal as described in claim 2, the means for sealing the tube from the cap comprising a closure ring and an outer part, said closure ring being compressed between the tube and outer part.

EDWARD K. BROWN.

REFERENCES CITED

The following references are of record in the file of this patent:

UNITED STATES PATENTS

| Number | Name | Date |
|---|---|---|
| 2,027,505 | Winkler | Jan. 14, 1936 |
| 2,033,403 | Smittle | Mar. 10, 1936 |
| 2,051,278 | Svenson | Aug. 18, 1936 |
| 2,112,461 | Kohler | Mar. 29, 1938 |
| 2,425,209 | Snyder | Aug. 5, 1947 |